United States Patent
Oka et al.

(10) Patent No.: US 9,804,455 B2
(45) Date of Patent: Oct. 31, 2017

(54) DISPLAY DEVICE

(71) Applicant: Japan Display Inc., Minato-ku (JP)

(72) Inventors: Shinichiro Oka, Tokyo (JP); Youichi Asakawa, Tokyo (JP); Akira Sakaigawa, Tokyo (JP); Tsutomu Harada, Tokyo (JP)

(73) Assignee: Japan Display Inc., Minato-ku (JP)

( * ) Notice: Subject to any disclaimer, the term of this patent is extended or adjusted under 35 U.S.C. 154(b) by 87 days.

(21) Appl. No.: 15/046,836

(22) Filed: Feb. 18, 2016

(65) Prior Publication Data

US 2016/0259219 A1 Sep. 8, 2016

(30) Foreign Application Priority Data

Mar. 4, 2015 (JP) .................................. 2015-042398

(51) Int. Cl.
*G09F 13/04* (2006.01)
*G02F 1/1343* (2006.01)
*G02F 1/1335* (2006.01)
*G02F 1/1362* (2006.01)

(52) U.S. Cl.
CPC .. *G02F 1/134363* (2013.01); *G02F 1/133514* (2013.01); *G02F 1/133621* (2013.01); *G02F 1/136286* (2013.01); *G02F 2001/133622* (2013.01); *G02F 2001/134345* (2013.01)

(58) Field of Classification Search
CPC ......... G02F 1/133514; G02F 1/133621; G02F 1/133624; G02F 2001/133622; G02F 2001/134345

See application file for complete search history.

(56) References Cited

U.S. PATENT DOCUMENTS

| 8,264,452 B2 | 9/2012 | You et al. | |
| 2004/0246225 A1* | 12/2004 | Mukawa | G03B 21/005 345/102 |
| 2010/0165013 A1* | 7/2010 | Yamamoto | G09G 3/3413 345/692 |
| 2015/0332647 A1* | 11/2015 | Kurasawa | G06F 3/0412 345/88 |
| 2015/0339988 A1* | 11/2015 | Kurasawa | G09G 3/3607 349/37 |

FOREIGN PATENT DOCUMENTS

| JP | 2003-140169 | 5/2003 |
| JP | 2005-258248 | 9/2005 |
| JP | 2007-17477 | 1/2007 |
| JP | 2010-32626 | 2/2010 |

* cited by examiner

*Primary Examiner* — Ali Alavi

(74) *Attorney, Agent, or Firm* — Oblon, McClelland, Maier & Neustadt, L.L.P.

(57) ABSTRACT

According to one embodiment, a display device includes a first color film of a first color and a second color film of a second color, wherein the irradiator comprises a first light source of a third color and a second light source of a fourth color, the first color and the second color have a complementary color relationship, lightness of the first color is greater than lightness of the second color, a first total displayable area of the first color film is larger than a second total displayable area of the second color film, and the irradiator is configured to radiate light of the first light source and the second light source in a switching manner by time division.

20 Claims, 10 Drawing Sheets

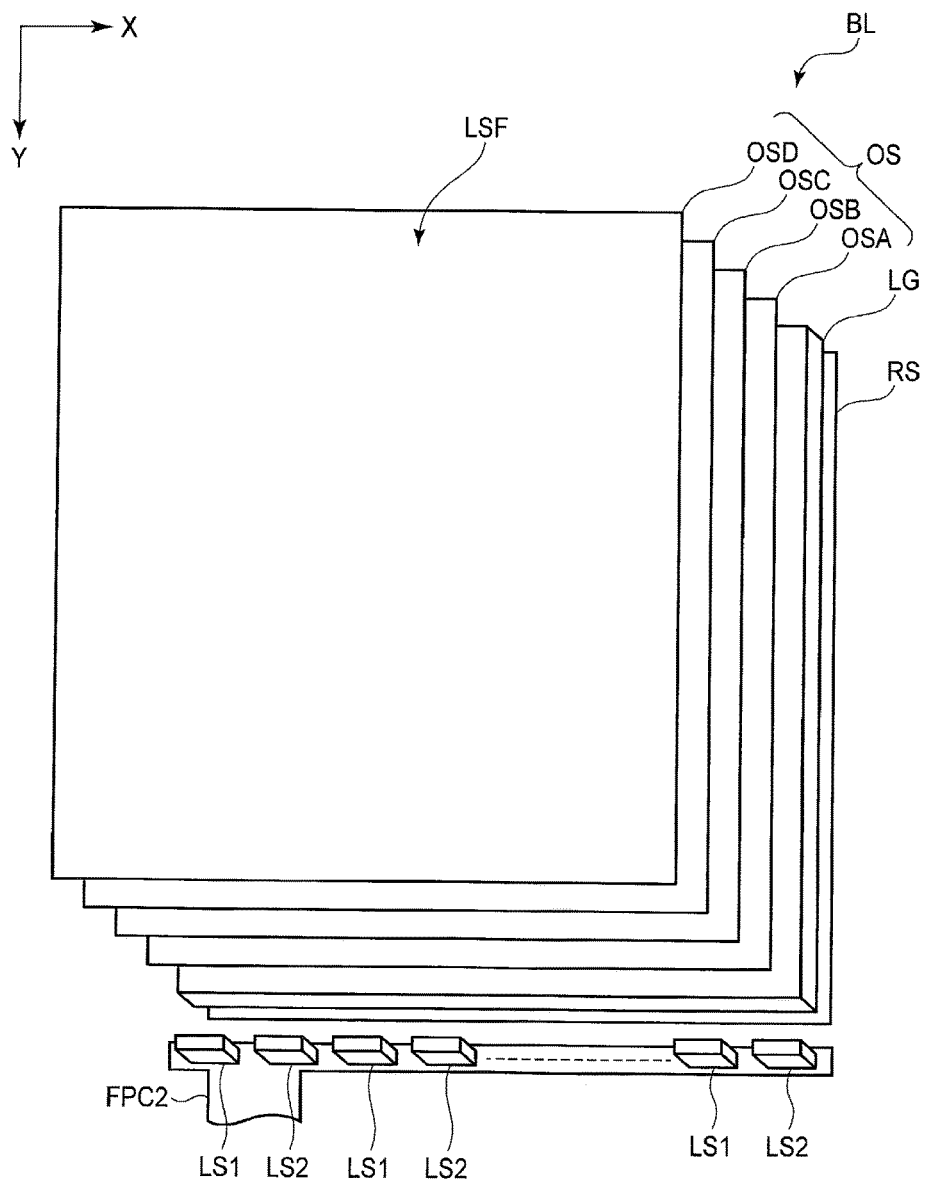
F I G. 2

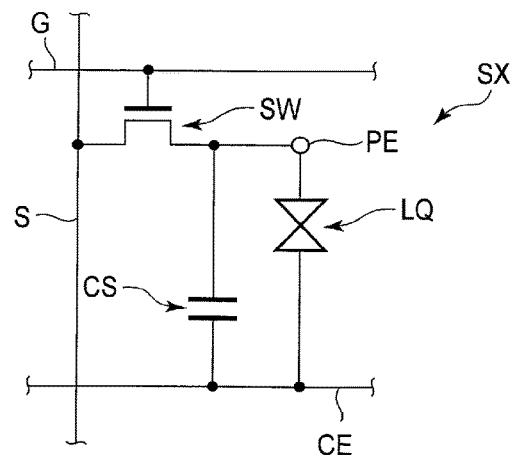
F I G. 3
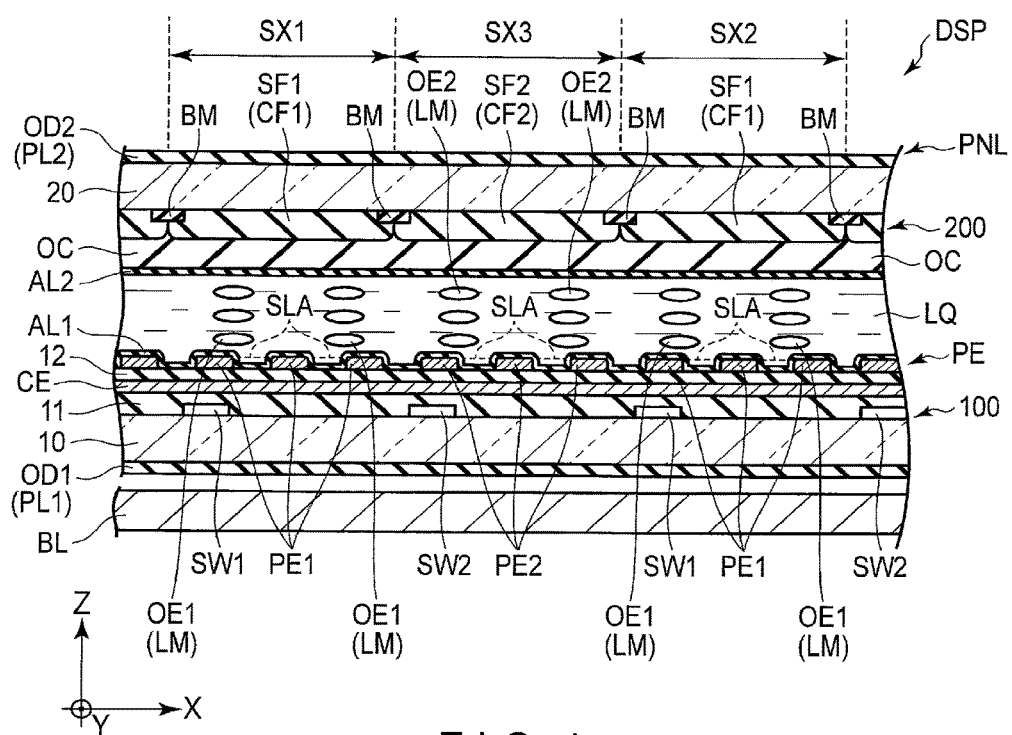
F I G. 4

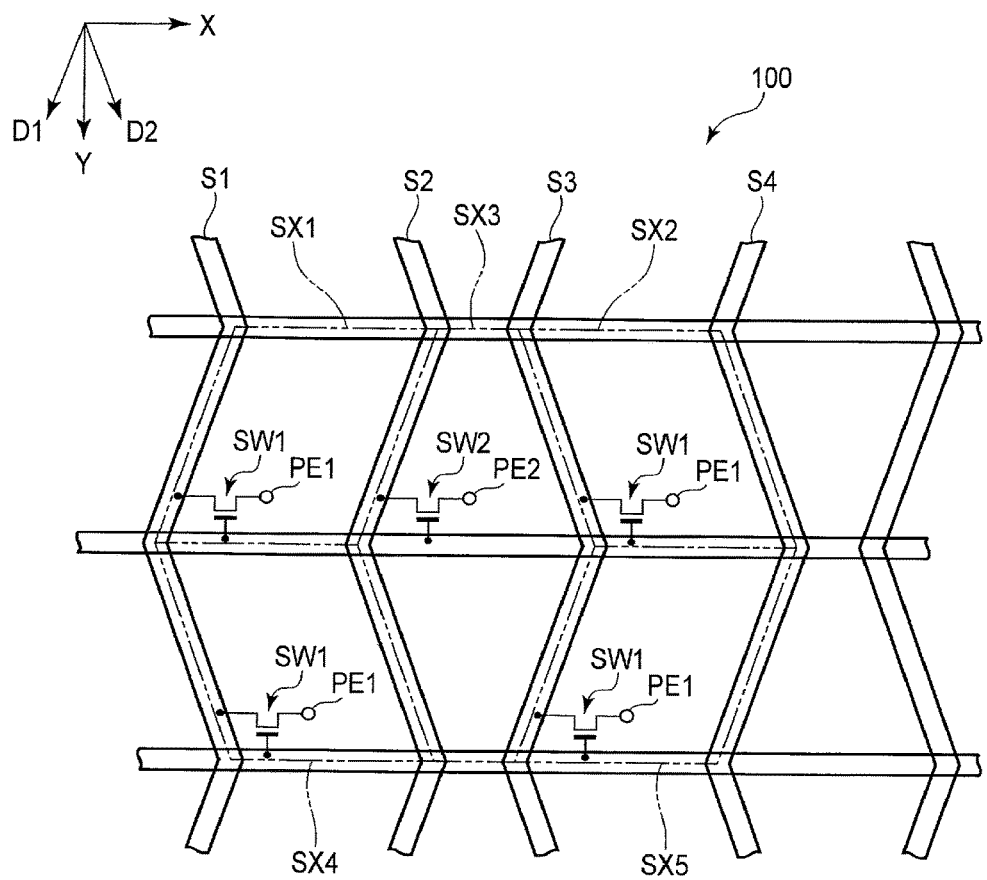
F I G. 5B

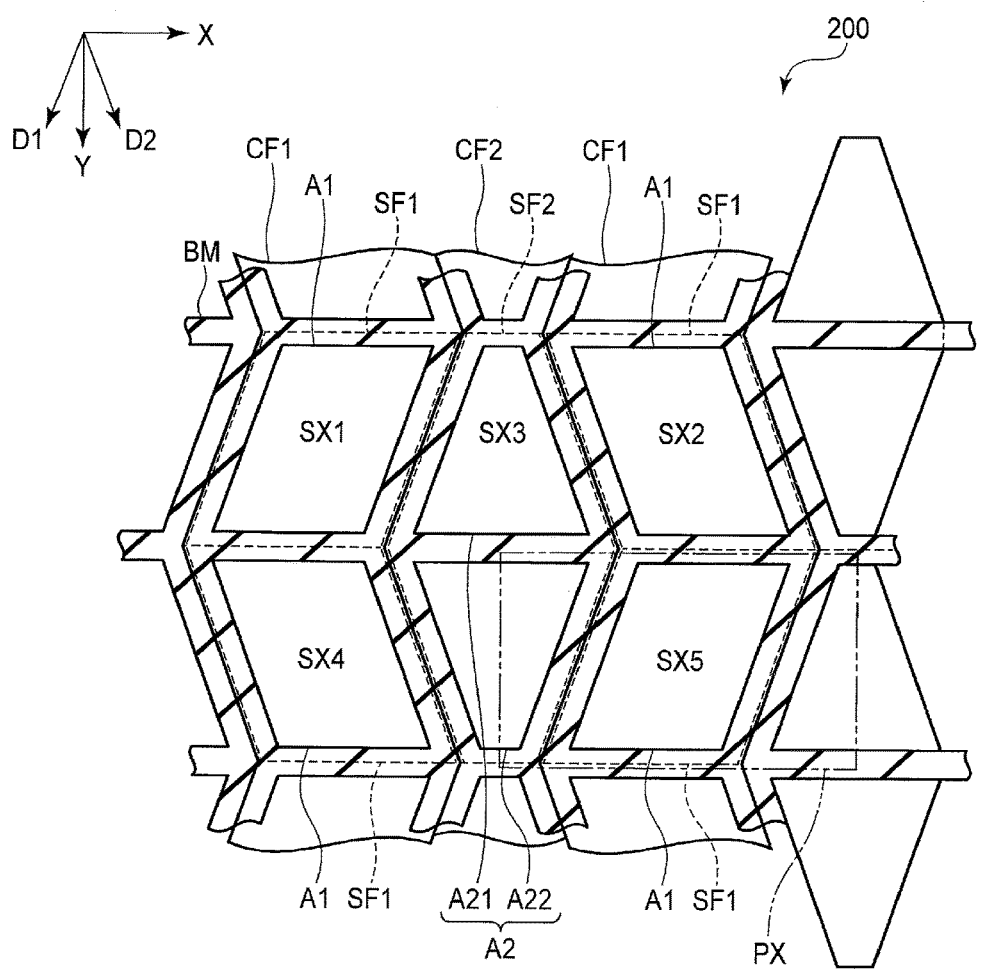
F I G. 5C

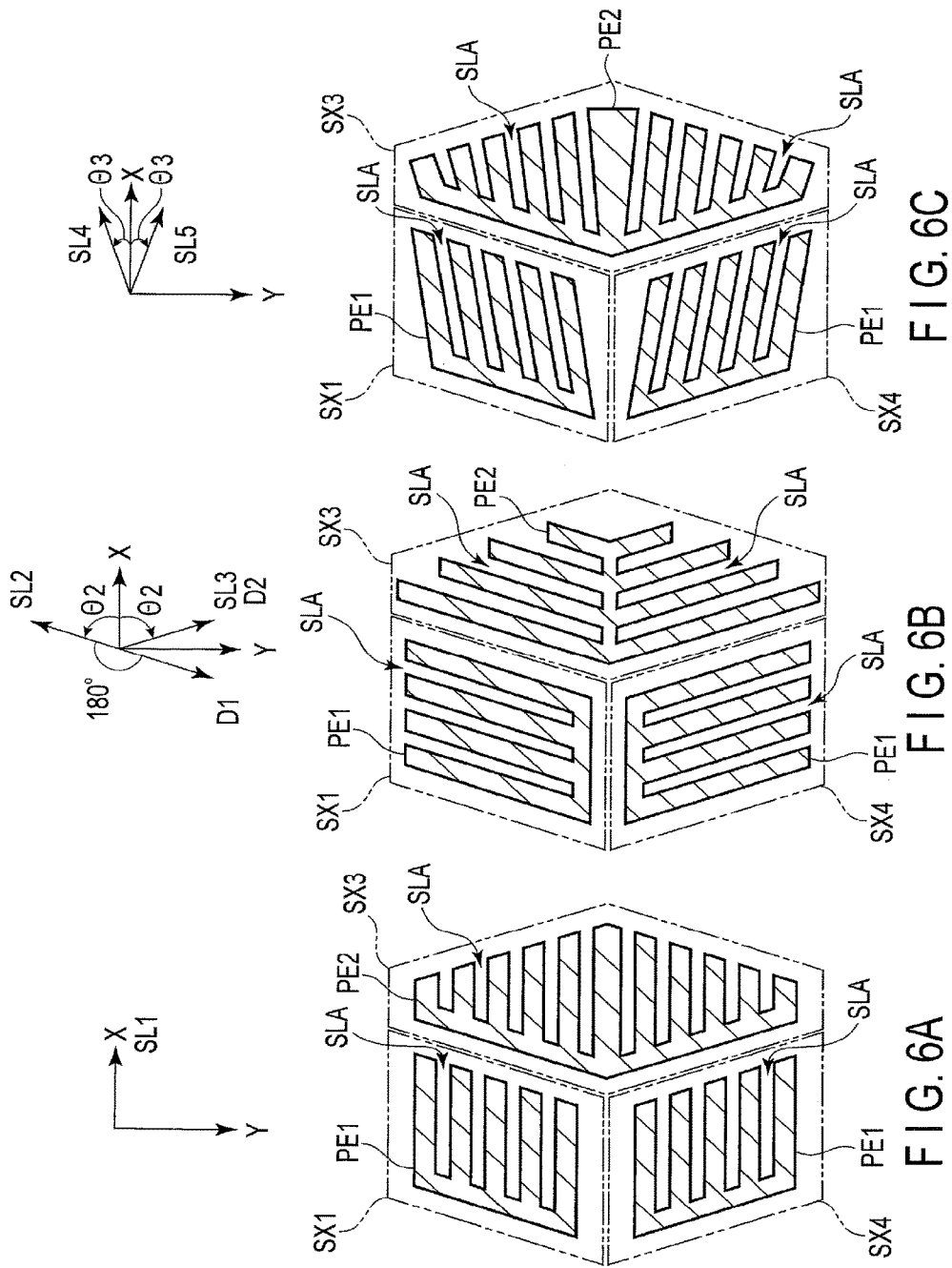

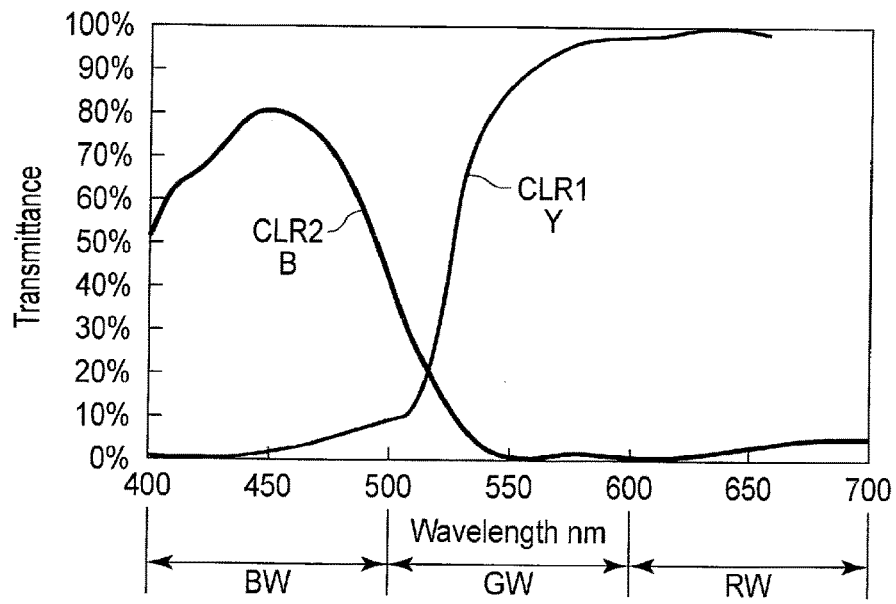
F I G. 7A
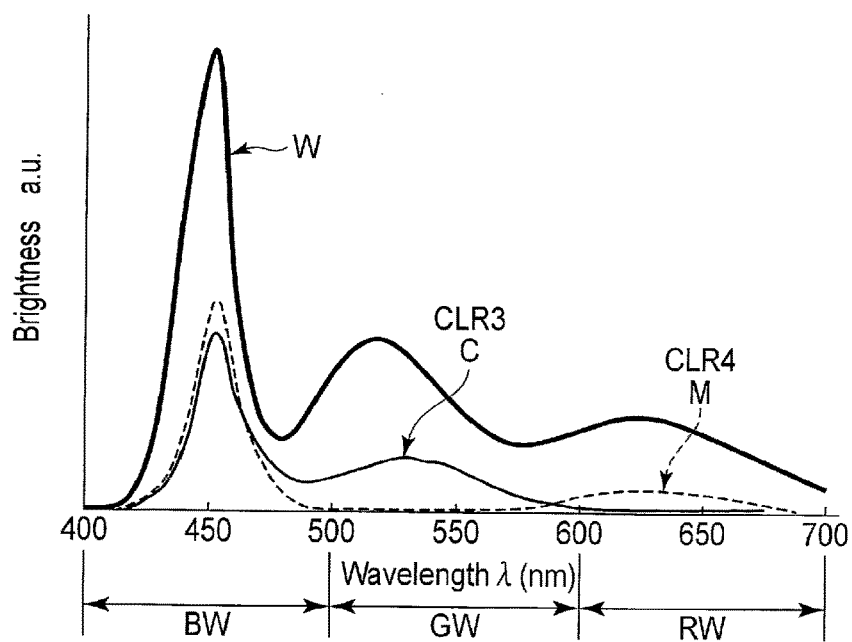
F I G. 7B

|  |  |  | Irradiator | Output color |
|---|---|---|---|---|
|  |  |  | Third color (First light source) |  |
|  |  |  | Fourth color (Second light source) |  |
| Pattern 1 | First color (First color film) | Yellow | Cyan | Green |
|  |  |  | Magenta | Red |
|  | Second color (Second color film) | Blue | Cyan | Blue |
|  |  |  | Magenta | Blue |
| Pattern 2 | First color (First color film) | Magenta | Cyan | Blue |
|  |  |  | Yellow | Red |
|  | Second color (Second color film) | Green | Cyan | Green |
|  |  |  | Yellow | Green |
| Pattern 3 | First color (First color film) | Cyan | Magenta | Blue |
|  |  |  | Yellow | Green |
|  | Second color (Second color film) | Red | Magenta | Red |
|  |  |  | Yellow | Red |

F I G. 8

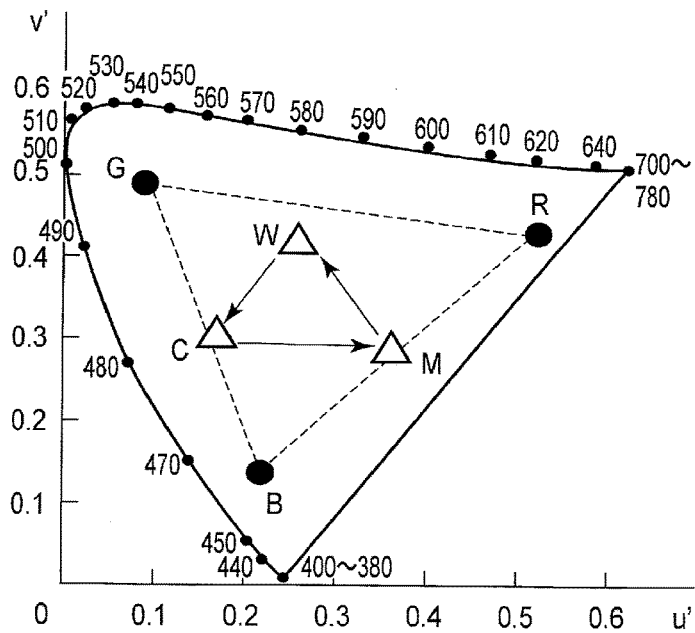

F I G. 9

DISPLAY DEVICE

CROSS-REFERENCE TO RELATED APPLICATIONS

This application is based upon and claims the benefit of priority from Japanese Patent Application No. 2015-042398, filed Mar. 4, 2015, the entire contents of which are incorporated herein by reference.

FIELD

Embodiments described herein relate generally to a display device and a color filter substrate.

BACKGROUND

In recent years, research into display devices has been actively conducted to achieve higher fineness by making pixels denser. One particular pixel structural arrangement for achieving higher fineness is based on the visual characteristics of the human eye, wherein the visual resolution for the range of blue wavelengths is lower than that for the range of red or green wavelengths. As an example of such a pixel arrangement, a hexagonal pixel structural arrangement forming a honeycomb structure is disclosed. The pixel structural arrangement is composed of hexagonal blue pixels arranged in the center and red and green pixels alternately arranged to face respective sides of the blue pixels.

In a display device having the above pixel structural arrangement, the constituent ratio between red, green, and blue is 3:3:1, and the number of blue pixels, for which the visual resolution is low, is small. Thus, the display device can display images with high quality and a small number of pixels.

Even in the display device having the above pixel structural arrangement, at least three pixels of red, green, and blue are necessary as the minimum units for displaying color images. Each pixel comprises a region which does not contribute to display, such as switching elements and various lines. Thus, if each pixel is miniaturized to produce higher fineness, the area of an opening contributing to display in each pixel cannot be sufficiently secured, and the transmittance of a display panel may decline. In addition, to obtain sufficient transmittance with an opening small in area, the brightness of a light source which irradiates the display panel needs to be increased. Thus, power consumption may be increased.

BRIEF DESCRIPTION OF THE DRAWINGS

FIG. 2 is a diagram showing a structure of an irradiator.

FIG. 3 is a diagram showing a structure of a sub-pixel included in a display area.

FIG. 4 is a diagram showing a cross-section of the display device.

FIG. 5B is a diagram showing a structure of a first substrate 100 in each sub-pixel.

FIG. 5C is a diagram showing a structure of a second substrate 200 in each sub-pixel.

FIG. 6A is a diagram showing a structure example of pixel electrodes.

FIG. 6B is a diagram showing a structure example of the pixel electrodes.

FIG. 6C is a diagram showing a structure example of the pixel electrodes.

FIG. 7A is a diagram showing transmittance spectra of a first color film and a second color film.

FIG. 7B is a diagram showing brightness spectra of light emitted from a first light source and a second light source.

FIG. 8 is a diagram showing combinations of first, second, third, and fourth colors.

FIG. 9 is a CIE 1976 UCS chromaticity diagram.

DETAILED DESCRIPTION

Figure 1:
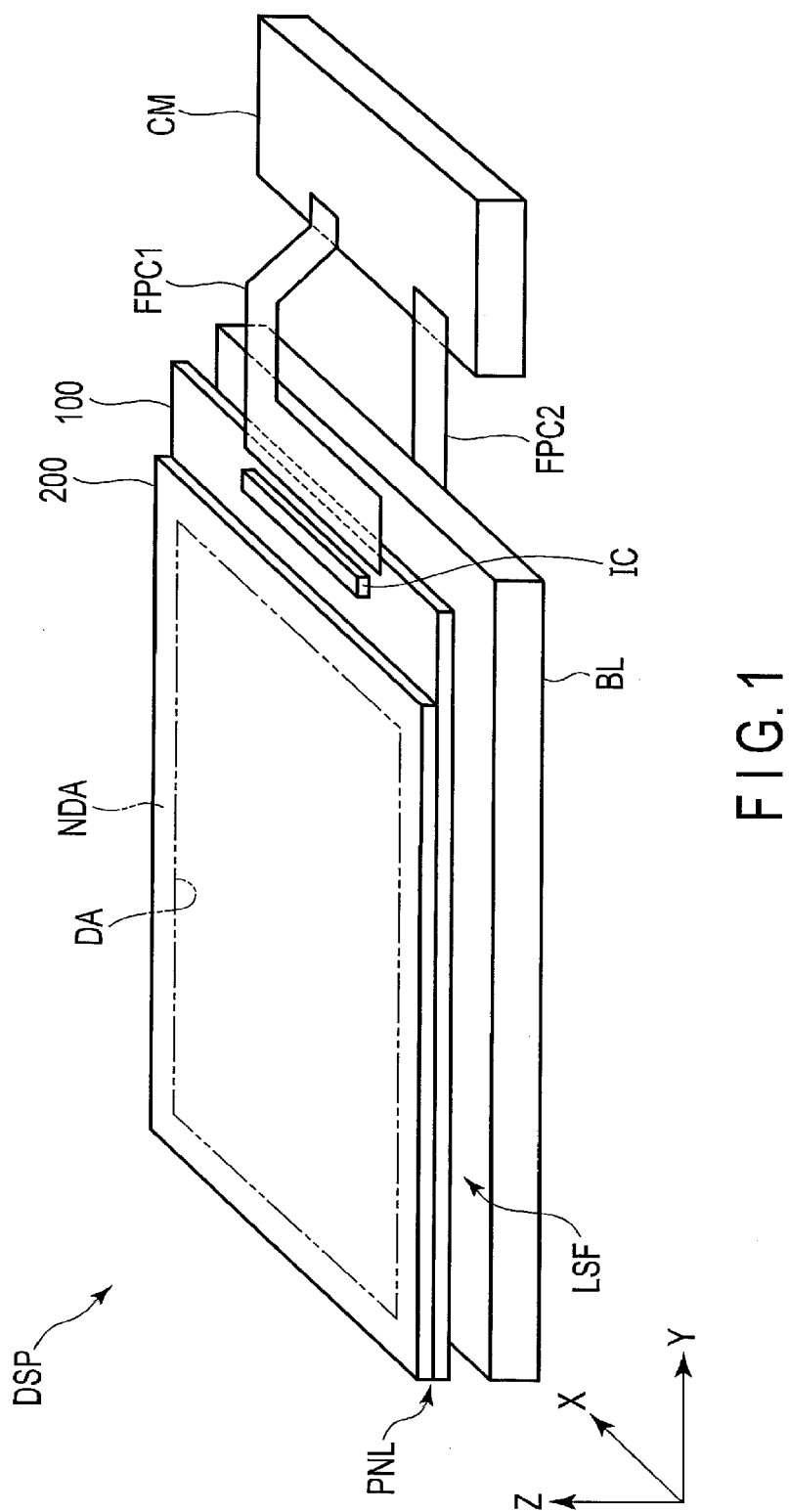
FIG. 1 is a perspective view showing an outline of a display device.

In general, according to one embodiment, a display device includes a first color film of a first color and a second color film of a second color in a display area in which an image is displayed, and being configured to display the image when light radiated by an irradiator is transmitted by the first color film and the second color film, wherein the irradiator comprises a first light source configured to radiate light of a third color and a second light source configured to radiate light of a fourth color, and is configured to radiate light to the display area, the first color and the second color have a complementary color relationship, lightness of the first color is greater than lightness of the second color, in the display area, a first total displayable area of the first color film is larger than a second total displayable area of the second color film, and the irradiator is configured to radiate light of the first light source and the second light source to the display area in a switching manner by time division.

According to another embodiment, a color filter substrate, which is used in a display device configured to switch a light source of an irradiator by time division, includes a first color film of a first color and a second color film of a second color, wherein the first color and the second color have a complementary color relationship, lightness of the first color is greater than lightness of the second color, and in a display panel, a first total displayable area of the first color film is larger than a second total displayable area of the second color film.

Embodiments will be described hereinafter with reference to the accompanying drawings. It should be noted that the disclosure is presented by way of example only, and any changes that can be easily conceived within the spirit of the invention by a person with ordinary skill in the art are naturally encompassed by the scope of the present invention. Moreover, to further clarify the explanations, the width, thickness, shape, etc., of each element may be schematically depicted in the drawings in comparison with actual embodiments, but they are presented by way of example only and do not limit the interpretation of the present invention. Furthermore, in the specification and the figures, structural elements having the same or similar functions will be given the same reference numbers, and overlapping detailed explanations are omitted as appropriate.

FIG. 1 is a perspective view showing an outline of a display device. In the present embodiment, a display device comprising a liquid crystal display panel with liquid crystal molecules functioning as optical elements will be described with reference to the drawings. However, the display device is not limited to this, and may be a display device comprising a mechanical display panel with a micro-electromechanical system (MEMS) shutter functioning as an optical element, or the like. If a MEMS shutter is used, a first polarizer PL1 and a second polarizer PL2, which will be described later, may not be provided.

A display device DSP comprises a display panel PNL, a driving integrated circuit (IC) chip IC which drives the display panel PNL, an irradiator BL which illuminates the display panel PNL, a control module CM, flexible circuit boards FPC1 and FPC2, etc. In the present embodiment, a first direction X is, for example, a short-side direction of the display panel PNL. A second direction Y is a direction crossing the first direction X, and is a long-side direction of the display panel PNL. In addition, a third direction Z is a direction crossing the first direction X and the second direction Y.

The display panel PNL comprises a first substrate 100, a second substrate 200 disposed to be opposed to the first substrate 100, a liquid crystal layer held between the first substrate 100 and the second substrate 200 (liquid crystal layer LQ, which will be described later). The display panel PNL comprises a display area DA where an image is displayed and a frame-shaped non-display area NDA located around the display area DA.

The irradiator BL is disposed to be opposed to the first substrate 100 side of the display panel PNL. The irradiator BL comprises a light-emitting surface LSF on a side opposed to the first substrate 100. The irradiator BL is a surface light source which radiates light from the light-emitting surface LSF to the display panel PNL. The light-emitting surface LSF is opposed to the whole display area DA. As will be described later, the irradiator BL radiates light of first light sources LS1 and light of second light sources LS2 to the display area DA in a switching manner by time division.

The driving IC chip IC is mounted on the first substrate 100 of the display panel PNL. The flexible circuit board FPC1 is mounted on the first substrate 100, and connects the display panel PNL and the control module CM. The flexible circuit board FPC2 connects the irradiator BL and the control module CM. For example, the control module CM outputs a signal necessary to drive the display panel PNL to the driving IC chip IC. In addition, the control module CM outputs a signal necessary to drive the irradiator BL.

The display device DSP having the above-described structure displays an image by selectively transmitting light striking from the irradiator BL to the display panel PNL.

FIG. 2 is a diagram showing a structure of the irradiator.

The irradiator BL comprises a light source unit LU, a light-guide plate LG, a reflective sheet RS, and an optical sheet OS. In an example, the light-guide plate LG comprises short sides along the first direction X and long sides along the second direction Y. The irradiator BL shown in the figure is an edge-light type backlight unit with the light source unit LU disposed outside the display area DA. However, the irradiator BL may be a direct backlight unit with the light source unit LU disposed in the display area DA.

The light source unit LU is, for example, disposed along a short side of the light-guide plate LG. The light source unit LU comprises the first light sources LS1 and the second light sources LS2 mounted on the flexible circuit board FPC2. The first light sources LS1 and the second light sources LS2 are, for example, alternately disposed along the short side of the light-guide plate LG. The first light sources LS1 and the second light sources LS2 are, for example, formed by stacking phosphor layers on light-emitting diodes (LED). The first light sources LS1 and the second light sources LS2 differ in the combinations of the color of light emitted from the light emitting diodes and the color of the phosphor layers, and are configured to emit light of colors differing from each other. It should be noted that the light source unit LU may be disposed along a long side of the light-guide plate LG. In such a case, the first light sources LS1 and the second light sources LS2 are, for example, alternately disposed along the long side of the light-guide plate LG.

The light-guide plate LG is formed into a flat plate. The light-guide plate LG is, for example, formed of a resin material such as an acrylic resin. Light striking from the first and second light sources LS1 and LS2 to the light-guide plate LG travels in the light-guide plate LG while repeating total reflection therein. Then, light that has ceased to satisfy the condition for total reflection is emitted from the light-guide plate LG.

The reflective sheet RS has a light reflecting property, and is disposed to be opposed to the light-guide plate LG. In the example shown in the figure, the reflective sheet RS is formed into a rectangle. Light emitted from the light-guide plate LG to the reflective sheet RS side is reflected by the reflective sheet RS, and reused as light emitted from the light-guide plate LG to the optical sheet OS side.

The optical sheet OS has a light transmitting property, and is disposed to be opposed to the light-guide plate LG on the opposite side to the reflective sheet RS. The optical sheet OS, for example, comprises a diffusion sheet OSA, a prism sheet OSB, a prism sheet OSC, and a diffusion sheet OSD. It should be noted that the optical sheet OS may comprise other sheets, for example, a brightness enhancement film.

In the present embodiment, in which an image is displayed in a field-sequential color (FSC) system, the irradiator BL radiates light of the first light sources LS1 and light of the second light sources LS2 to the display area DA in a switching manner by time division.

FIG. 3 is a diagram showing a structure of a sub-pixel included in the display area.

Each sub-pixel SX comprises a switching element SW, a pixel electrode PE, a common electrode CE, a liquid crystal layer LQ, etc. The switching element SW is formed of, for example, a thin-film transistor (TFT). The switching element SW is electrically connected to a gate line G and a signal line S. The pixel electrode PE is electrically connected to the switching element SW. The pixel electrode PE is opposed to the common electrode CE, and drives the liquid crystal layer LQ by an electric field produced between the pixel electrode PE and the common electrode CE. A storage capacitor CS is, for example, formed between the common electrode CE and the pixel electrode PE.

FIG. 4 is a diagram showing a cross-section of the display device. The figure also shows cross-sections of a first sub-pixel SX1, a second sub-pixel SX2, and a third sub-pixel SX3 located between the first sub-pixel SX1 and the second sub-pixel SX2. The first and second sub-pixels SX1 and SX2 have the same structure.

The figure shows a liquid crystal display device in a display mode using a lateral electric field as an example. It should be noted that the display mode of the liquid crystal display device in the present embodiment is not particularly limited to this, and may be a mode in which other electric fields such as a longitudinal electric field are used.

The first substrate 100 comprises a first insulating substrate 10, first switching elements SW1, second switching elements SW2, a first insulating film 11, a common electrode CE, a second insulating film 12, first pixel electrodes PE1, second pixel electrodes PE2, a first alignment film AL1, etc. In the following description of the first substrate 100, "on" is used for the side opposed to the liquid crystal layer LQ.

The first insulating substrate 10 is formed of a material having a light transmitting property and an insulating property, such as glass or resin.

The first and second switching elements SW1 and SW2 are disposed on the first insulating substrate 10. In the example shown in the figure, the first switching elements SW1 are disposed in regions corresponding to the first and second sub-pixels SX1 and SX2, respectively. The second switching element SW2 is disposed in a region corresponding to the third sub-pixel SX3. The first insulating film 11 is disposed on the first insulating substrate 10, the first switching elements SW1, and the second switching elements SW2.

The common electrode CE is formed on the first insulating film 11. The common electrode CE is formed of, for example, a transparent conductive material such as indium tin oxide (ITO) or indium zinc oxide (IZO). The second insulating film 12 is disposed on the common electrode CE.

The first and second pixel electrodes PE1 and PE2 are disposed on the second insulating film 12, and opposed to the counter electrode CE via the second insulating film 12. In the first and second pixel electrodes PE1 and PE2, slits SLA are formed. The first pixel electrode PE1 is formed in a region corresponding to the first sub-pixel SX1, and electrically connected to the first switching element SW1 at a position not shown in the figure. The second pixel electrode PE2 is formed in a region corresponding to the third sub-pixel SX3, and electrically connected to the second switching element SW2 at a position not shown in the figure. In the region corresponding to the third sub-pixel SX3, the first pixel electrode PE1 and the first switching element SW1 are electrically connected as in the region corresponding to the first sub-pixel SX1. The first and second pixel electrodes PE1 and PE2 are formed of a transparent conductive material such as ITO or IZO.

The first alignment film AL1 covers the second insulating film 12, the first and second pixel electrodes PE1 and PE2, etc. The first alignment film AL1 is formed of a material having a liquid crystal alignment property such as horizontal alignment, and disposed on a surface contacting the liquid crystal layer LQ of the first substrate 100.

The second substrate 200 comprises a second insulating substrate 20, a light-shielding layer BM, a first color film CF1 including first color sub-films SF1, a second color film CF2 including second color sub-films SF2, an overcoat layer OC, a second alignment film AL2, etc. The second insulating substrate 20 is formed of a material having a light transmitting property and an insulating property, such as glass or resin.

The light-shielding layer BM and the first and second color sub-films SF1 and SF2 are formed on a side opposed to the liquid crystal layer LQ of the second insulating substrate 20. Parts of the first and second color sub-films SF1 and SF2 overlap the light-shielding layer BM. The light-shielding layer BM is formed of a black resin material or a light-shielding metallic material which has low light transmittance and low reflectance. The first color sub-films SF1 are disposed in regions corresponding to the first and second sub-pixels SX1 and SX2, and the second color sub-film SF2 is disposed in a region corresponding to the third sub-pixel SX3. In addition, the first color sub-films SF1 are opposed to the first pixel electrodes PE1, and the second color sub-film SF2 is opposed to the second pixel electrode PE2. The first color sub-films SF1 are formed of a resin material which is colored in a first color CLR1 and has a light transmitting property. The first color sub-films SF1 correspond to portions of the first color films CF1, which are disposed in regions corresponding to the first and second sub-pixels SX1 and SX2. The second color sub-film SF2 is formed of a resin material which is colored in a second color CLR2 and has a light transmitting property. The second color sub-film SF2 corresponds to a portion of the second color film CF2, which is disposed in a region corresponding to the third sub-pixel SX3. The first and second color sub-films SF1 and SF2 are, for example, alternately disposed in the first direction X. Boundaries between the first color sub-films SF1 and the second color sub-films SF2 are, for example, opposed to the light-shielding layer BM.

The overcoat layer OC covers the first and second color sub-films SF1 and SF2. The overcoat layer OC is formed of, for example, a transparent resin material.

The second alignment film AL2 covers the overcoat layer OC. The second alignment film AL2 is formed of a material having a liquid crystal alignment property such as horizontal alignment, and disposed on a surface contacting the liquid crystal layer LQ of the second substrate 200. The first and second alignment films AL1 and AL2 are formed of, for example, a polyimide which has been subjected to alignment treatment such as rubbing treatment or photo-alignment treatment.

The liquid crystal layer LQ is disposed between the first substrate 100 and the second substrate 200. The liquid crystal layer LQ includes liquid crystal molecules LM. Major axes of the liquid crystal molecules LM are initially aligned along the surfaces of the first and second alignment films AL1 and AL2 or an X-Y plane by alignment restriction force of the first and second alignment films AL1 and AL2. The alignment direction of the liquid crystal molecules LM varies in accordance with the strength of an electric field formed in the liquid crystal layer LQ. The liquid crystal molecules LM function as optical elements controlling the light transmittance of the display panel PNL.

First optical element OE1 are disposed in a region corresponding to the first sub-pixel SX1 or the second sub-pixel SX2. Second optical element OE2 are disposed in a region corresponding to the third sub-pixel SX3. Each first optical element OE1 is disposed to be opposed to one first color sub-film SF1. Each second optical element OE2 is disposed to be opposed to one second color sub-film SF2. That is, the display panel PNL comprises the same number of first optical elements OE1 as the first color sub-films SF1 and the same number of second optical elements OE2 as the second color sub-films SF2.

The first optical elements OE1 disposed in the region corresponding to the first sub-pixel SX1 change the light transmittance of the first sub-pixel SX1 in accordance with the strength of a voltage applied to the first pixel electrode PE1. The voltage applied to the first pixel electrode PE1 is controlled by the first switching element SW1 disposed in the first sub-pixel SX1. The same as in the first sub-pixel SX1 applies to the second sub-pixel SX2. The second optical elements OE2 disposed in the region corresponding to the third sub-pixel SX3 change the light transmittance of the third sub-pixel SX3 in accordance with the strength of a voltage applied to the second pixel electrode PE2. The voltage applied to the second pixel electrode PE2 is controlled by the second switching element SW2 disposed in the third sub-pixel SX3. That is, each first switching element SW1 controls one first optical element OE1 corresponding to one first color sub-film SF1. Each second switching element SW2 controls one second optical element OE2 corresponding to one second color sub-film SF2.

A first optical function layer OD1 is, for example, disposed between the first insulating substrate 10 and the irradiator BL. The first optical function layer OD1 comprises the first polarizer PL1. A second optical function layer OD2 is, for example, disposed on the opposite side to a surface of the second insulating substrate 20 on which the first and second color sub-films SF1 and SF2 are disposed. The second optical function layer OD2 comprises the second polarizer PL2. An absorption axis of the first polarizer PL1 and an absorption axis of the second polarizer PL2 are, for example, orthogonal.

In the present embodiment, a color filter substrate corresponds to the second substrate 200. It should be noted that the first color film CF1 (first color sub-films SF1) and the second color film CF2 (second color sub-films SF2) may provided on the first substrate 100 in which the first and second switching elements SW1 and SW2 are formed. In such a case, the color filter substrate corresponds to the first substrate 100.

Figure 5A:
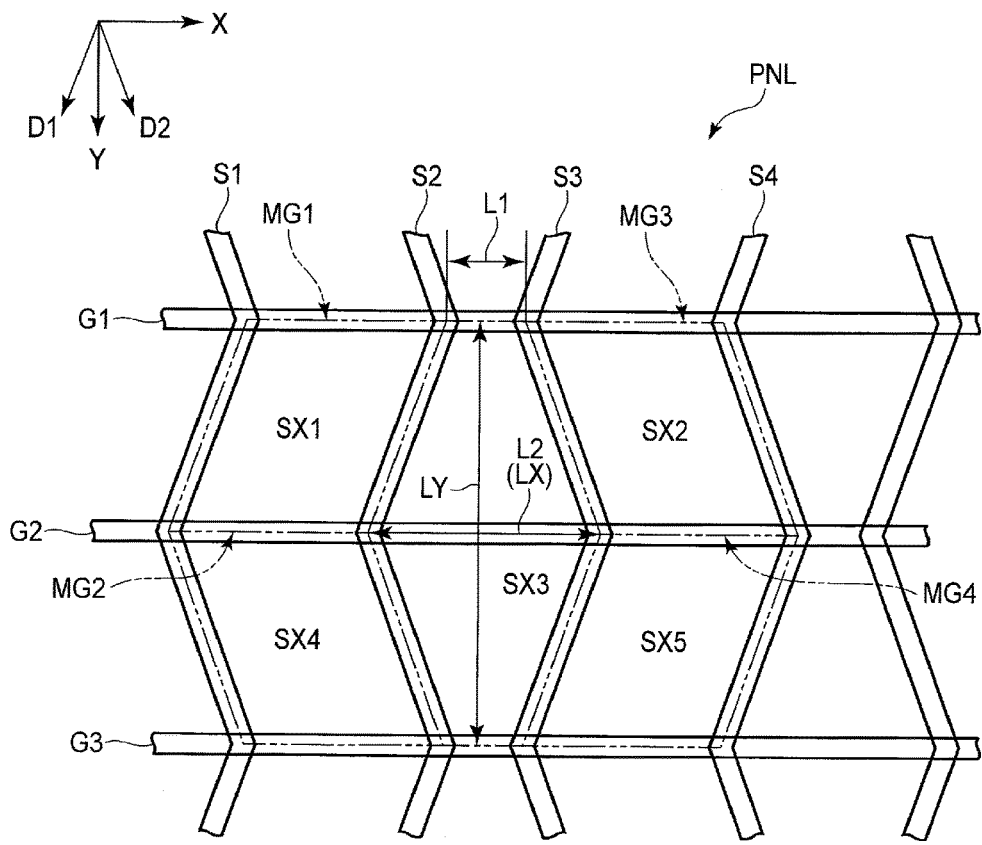
FIG. 5A is a diagram showing an example of a structural arrangement of sub-pixels.

FIG. 5A is a diagram showing an example of a structural arrangement of sub-pixels. In the example shown in the figure, the second direction Y is orthogonal to the first direction X. A first extension direction D1 is a direction rotated right-handed at a first acute angle θ with respect to the second direction Y. A second extension direction D2 is a direction rotated left-handed at the first acute angle θ with respect to the second direction Y.

First to third gate lines G1 to G3 extend in the first direction X. First to fourth signal lines S1 to S4 extend alternately in the first and second extension directions D1 and D2, and the signal lines as a whole extend in the second direction Y. In an example, the first to fourth signal lines S1 to S4 bend at positions where they cross the first to third gate lines G1 to G3. The first and second signal lines S1 and S2 extend in the first extension direction D1 between the first gate line G1 and the second gate line G2, and extend in the second extension direction D2 between the second gate line G2 and the third gate line G3. The third and fourth signal lines S3 and S4 extend in the second extension line D2 between the first gate line G1 and the second gate line G2, and extend in the first extension direction D1 between the second gate line G2 and the third gate line G3.

In the example shown in the figure, the first sub-pixel SX1 is separated by the first and second gate lines G1 and G2 and the first and second signal lines S1 and S2. The second sub-pixel SX2 is separated by the first and second gate lines G1 and G2 and the third and fourth signal lines S3 and S4. The third sub-pixel SX3 is separated by the first and third gate lines G1 and G3 and the second and third signal lines S2 and S3. A fourth sub-pixel SX4 is separated by the second and third gate lines G2 and G3 and the first and second signal lines S1 and S2. A fifth sub-pixel SX5 is separated by the second and third gate lines G2 and G3 and the third and fourth signal lines S3 and S4. That is, the first and fifth sub-pixels SX1 and SX5 extend in a direction differing from that of the second and fourth sub-pixels SX2 and SX4. Specifically, the first and fifth sub-pixels SX1 and SX5 extend in the first extension direction D1, and the second and fourth sub-pixels SX2 and SX4 extend in the second extension direction D2.

The positional relationship between the first to fifth sub-pixels SX1 to SX5 will be described. In the first direction X, the third sub-pixel SX3 is located between the first sub-pixel SX1 and the second sub-pixel SX2 and between the fourth sub-pixel SX4 and the fifth sub-pixel SX5. In addition, in the first direction X, the third sub-pixel SX3 is adjacent to the first and fourth sub-pixels SX1 and SX4 on one side, and adjacent to the second and fifth sub-pixels SX2 and SX5 on the other side. The first sub-pixel SX1 and the fourth sub-pixel SX4, or the second sub-pixel SX2 and the fifth sub-pixel SX5, are adjacent to each other in the second direction Y with the third sub-pixel SX3 not interposed therebetween.

For example, the first sub-pixel SX1 comprises first and second sides MG1 and MG2. The first and second sides MG1 and MG2 are parts of the outline of the first sub-pixel SX1, and correspond to portions extending in the first direction X. The second side MG2 is located on the opposite side to the first side MG1. The second sub-pixel SX2 comprises third and fourth sides MG3 and MG4. The third and fourth sides MG3 and MG4 are parts of the outline of the second sub-pixel SX2, and correspond to portions extending in the first direction X. The third side MG3 is aligned with the first side MG1 in the extension direction of the first side MG1. The fourth side MG4 is aligned with the second side MG2 in the extension direction of the second side MG2.

In the third sub-pixel SX3, a length L1 between the first side MG1 and the third side MG3 differs from a length L2 between the second side MG2 and the fourth side MG4. In the example shown in the figure, the length L1 is shorter than the length L2 in the third sub-pixel SX3. The length L1 may be zero.

The maximum value of a length LX of the third sub-pixel SX3 in the first direction X is smaller than the maximum value of a length LY of the third sub-pixel SX3 in the second direction Y. For example, the length LX is greatest at a position on the same line as the second side MG2. In addition, the length LY is greatest at an intermediate position between the first side MG1 and the third side MG3.

FIG. 5B is a diagram showing a structure of the first substrate 100 in each sub-pixel.

The first sub-pixel SX1 comprises the first switching element SW1 and the first pixel electrode PE1. In the example shown in the figure, the first switching element SW1 is electrically connected to the second gate line G2 and the first signal line S1. The first pixel electrode PE1 is electrically connected to the first switching element SW1. The first pixel electrode PE1 is surrounded by the first and second gate lines G1 and G2 and the first and second signal lines S1 and S2. The second, fourth, and fifth sub-pixels have the same structure as that of the first sub-pixel SX1. Thus, the same reference numbers are given, and detailed explanations thereof are omitted.

The third sub-pixel SX3 comprises the second switching element SW2 and the second pixel electrode PE2. In the example shown in the figure, the second switching element SW2 is electrically connected to the second gate line G2 and the second signal line S2. The second pixel electrode PE2 is electrically connected to the second switching element SW2. The second pixel electrode PE2 is surrounded by the first and third gate lines G1 and G3 and the second and third signal lines S3 and S3. In the example shown in the figure, the second pixel electrode PE2 crosses the second gate line G2 substantially at its central portion.

In the display area DA, the number of first switching elements SW1 is greater than that of second switching elements SW2. In the example shown in the figure, one second switching element SW2 is adjacent to four first switching elements SW1. In the display area DA comprising first and second switching elements SW1 and SW2 in the layout shown in the figure, the ratio of the first switching elements SW1 to at of second switching elements SW2 is 2:1. In addition, in the example shown in the figure, one second pixel electrode PE2 is adjacent to four first pixel electrodes PE1. In the display area DA comprising first and second electrodes PE1 and PE2 in the layout shown in the figure, the ratio of the first pixel electrodes PE1 to the second pixel electrodes PE2 is 2:1.

FIG. 5C is a diagram showing a structure of the second substrate 200 in each sub-pixel.

The light-shielding layer BM is opposed to the first to third gate lines G1 to G3 and the first to fourth signal lines S1 to S4 shown in FIG. 5B. The light-shielding layer BM is, for example, disposed to prevent glare due to the reflection of external light in gate lines and signal lines formed of metallic materials. A region where the light-shielding layer BM is disposed transmits no light and does not contribute to display. A region where the light-shielding layer BM is not disposed corresponds to a displayable region which can transmit light.

In FIG. 5C, the first color film CF1 is disposed between the first signal line S1 and the second signal line S2 and between the third signal line S3 and the fourth signal line S4, and extends alternately in the first extension direction D1 and the second extension direction D2. The second color film CF2 is disposed between the second signal line S2 and the third signal line S3. The first and second color films CF1 and CF2 are alternately arranged in the first direction X. Adjacent end portions of the first color film CF1 and the second color film CF2 are opposed to the light-shielding layer BM. That is, the first, second, fourth, and fifth sub-pixels SX1, SX2, SX4, and SX5 comprise the first color film CF1. The third sub-pixel SX3 comprises the second color film CF2.

The first color film CF1 is composed of a plurality of first color sub-films SF1. The first color sub-films SF1 are arranged in the second direction Y. The respective first color sub-films SF1 are disposed in regions corresponding to the first, second, fourth, and fifth sub-pixels SX1, SX2, SX4, and SX5. For example, the outline of the first sub-pixel SX1 substantially corresponds to the outline of the first color sub-film SF1. The same applies to the outlines of the second, fourth, and fifth sub-pixels SX2, SX4, and SX5. Adjacent end portions of the first color sub-films SF1 are opposed to the light-shielding layer BM which shades each gate line. Adjacent end portions of the first color sub-films SF1 and the second color film CF2 are opposed to the light-shielding layer BM which shades each signal line. That is, one first color sub-film SF1 is disposed to correspond to one displayable region.

The second color film CF2 is composed of a plurality of second color sub-films SF2. The second color sub-films SF2 are arranged in the second direction Y. One second color sub-film SF2 is disposed in a region corresponding to the third sub-pixel SX3. For example, the outline of the third sub-pixel SX3 substantially corresponds to the outline of the second color sub-film SF2. An end portion of the second color sub-film SF2 formed in the third sub-pixel SX3 and an end portion of another second color sub-film SF2 adjacent to the second color sub-film SF2 are opposed to the light-shielding layer BM which shades the first and third gate lines G1 and G3. Adjacent end portions of the second color sub-films SF2 and the first color film CF1 are opposed to the light-shielding layer BM which shades each signal line. The second color sub-films SF2 are opposed to the light-shielding layer BM which shades the second gate line G2. That is, in the example shown in the figure, one second color sub-film SF2 is disposed to correspond to two divided displayable regions.

For example, the length of the second color sub-film SF2 in the first direction X is largest in vicinity of the second gate line G2 crossing the second color sub-film SF2. The length of the second color sub-film SF2 in the second direction Y is largest between the second signal line S2 and the third signal line S3. The maximum value of the length of the second color sub-film SF2 in the first direction X is less than the maximum value of the length of the second color sub-film SF2 in the second direction Y.

In the example shown in the figure, one second color sub-film SF2 is adjacent to four first color sub-films SF1. One first color sub-film SF1 is adjacent to two second color sub-films SF2. That is, the number of first color sub-films SF1 adjacent to a second color sub-film SF2 is greater than that of second color sub-films SF2 adjacent to a first color sub-film SF1. One or more second color sub-films SF2 are surrounded by first color sub-films SF1 which are greater in number than the one or more second color sub-films SF2. In the example shown in the figure, the ratio of the first color sub-films SF1 to the second color sub-films SF2 is 2:1.

A first area A1 is the area of a displayable region in one first color sub-film SF1. A second area A2 is the area of a displayable region in one second color sub-film SF2. In the example shown in the figure, the second area A2 is the sum of the areas of two displayable regions divided by the light-shielding layer BM which shades the second gate line G2 crossing the second color sub-film SF2. At this time, in the example shown in the figure, the second area A2 is the sum of an area A21 and an area A22. The area A21 is the area of a displayable region surrounded by the light-shielding layer BM opposed to the first and second gate lines G1 and G2 and the second and third signal lines S2 and S3. In the example shown in the figure, the area A22 is the area of a displayable region surrounded by the light-shielding layer BM opposed to the second and third gate lines G2 and G3 and the second and third signal lines S2 and S3. As the light-shielding layer BM, light-shielding layers for gate lines and light-shielding layers for signal lines may be separately formed.

The first area A1 is smaller than the second area A2. However, the number of first color sub-films SF1 is greater than that of second color sub-films SF2, and the sum of all the first areas A1 is greater than that of all the second areas A2. In the example shown in the figure, the number of first color sub-films SF1 is twice greater than that of second color sub-films SF2, and twice the first area A1 is greater than the second area A2. Therefore, the sum of all the first areas is greater than that of all the second areas. That is, in the above-described display area DA, the first displayable areas A1 of the first color sub-films SF1 are smaller than the second displayable areas A2 of the second color sub-films SF2. In addition, in the display area DA, the total displayable area of the first color films CF1 is greater than that of the second color films CF2.

For example, a pixel PX which is the smallest display unit of an image is composed of one first color sub-film SF1 and parts of two second color sub-films SF2. Adjacent pixels PX include adjacent parts of the same second color sub-film SF2. For example, such parts of the second color sub-film SF2 corresponds to approximately one fourth the second color sub-film SF2. That is, the displayable area of the pixel PX is the sum of the displayable area of one first color sub-film SF1 and half the displayable area of one second color sub-film SF2. For example, the shape of pixels PX is a rectangle or a square. Thus, the pixels PX can be arranged in a matrix without a gap in the above-described rectangular display area DA.

FIG. 6A to FIG. 6C are diagrams showing structure examples of pixel electrodes. The pixel electrodes shown in the figures herein are the first pixel electrodes PE1 of the first and fourth sub-pixels SX1 and SX4 and the second pixel electrode PE2 of the third sub-pixel SX3 shown in FIG. 5B. In the example shown in the figures, the first and second pixel electrodes PE1 and PE2 are comb electrodes.

FIG. 6A shows the first and second pixel electrodes PE1 and PE2 in which the slits SLA extend in a first slit direction SL1. For example, the first slit direction SL1 corresponds to the first direction X.

FIG. 6B shows the first pixel electrodes PE1 in which the slits SLA extend in a second slit direction SL2 or a third slit direction SL3. In addition, the figure shows the second pixel electrode PE2 in which the slits SLA extend in the second and third slit directions SL2 and SL3. The second slit direction SL2 is a direction rotated left-handed at a second acute angle $\theta 2$, which is greater than 45 degrees, with respect to the first direction X. The third slit direction SL3 is a direction rotated right-handed at the second acute angle $\theta 2$ with respect to the first direction X. For example, the second slit direction SL2 corresponds to the first extension direction D1. In addition, the third slit direction SL3 corresponds to the second extension direction D2.

FIG. 6C shows the first pixel electrodes PE1 in which the slits SLA extend in a fourth slit direction SL4 or a fifth slit direction SL5. In addition, the figure shows the second pixel electrode PE2 in which the slits SLA extend in the fourth and fifth slit directions SL4 and SL5. The fourth slit direction SL4 is a direction rotated left-handed at a third acute angle $\theta 3$, which is smaller than 45 degrees, with respect to the first direction X. The fifth slit direction SL5 is a direction rotated right-handed at the third acute angle $\theta 3$ with respect to the first direction X.

As shown in FIG. 6B and FIG. 6C, the slits SLA of pixel electrodes adjacent in the second direction Y extend in different directions, whereby the adjacent sub-pixels form a pseudo-multi-domain and the display quality of the display device is improved. The extension directions of the slits SLA are not particularly limited, and may be directions other than the first to fifth slit directions SL1 to SL5.

FIG. 7A is a diagram showing transmittance spectra of the first and second color films. In the figure, the vertical axis shows transmittance, and the horizontal axis shows wavelengths. In addition, a blue wavelength region BW is a wavelength region of 400 to 500 nm, a green wavelength region GW is a wavelength region of 500 to 600 nm, and a red wavelength region RW is a wavelength region of 600 to 700 nm.

The first color CLR1 is determined by the wavelength of light transmitted by the first color film CF1. The second color CLR2 is determined by the wavelength of light transmitted by the second color film CF2. In the example shown in the figure, the first color film CF1 has high transmittance in the green wavelength region GW and the red wavelength region RW. Thus, the first color CLR1 is yellow (Y). The second color film CF2 has high transmittance in the blue wavelength region BW. Thus, the second color CLR2 is blue (B). As will be described later, the first color CLR1 is not limited to yellow, and the second color CLR2 is not limited to blue.

FIG. 7B is a diagram showing brightness spectra of light emitted from the first and second light sources. In the figure, the vertical axis shows brightness, and the horizontal axis shows wavelengths.

For example, the first light sources LS1 are formed by stacking blue LEDs and green phosphors. The second light sources LS2 are formed by stacking the same blue LEDs as those of the first light sources LS1 and red phosphors. At this time, the spectrum of light emitted from the first light sources LS1 reaches a high peak in the blue wavelength region BW and a low peak in the green wavelength region GW. Thus, a third color CLR3 is cyan (C). The spectrum of light emitted from the second light sources LS2 reaches a high peak in the blue wavelength region BW and a low peak in the red wavelength region RW. Thus, a fourth color CLR4 is magenta (M). A peak wavelength of cyan in the blue wavelength region BW corresponds to a peak wavelength of magenta in the blue wavelength region BW. White (W) is in a spectrum covered when the first light sources LS1 and the second light sources LS2 simultaneously emit light. The manufacturing costs of the above-described first and second light sources LS1 and LS2 can be reduced because of the commonality of components (blue LEDs).

FIG. 8 is a diagram showing combinations of first, second, third, and fourth colors.

It is preferable that the display device of the present embodiment have the color characteristics of red, green, and blue by combining the third color CLR3 and the fourth color CLR4 (for example, if white light is obtained by combining the third color CLR3 and the fourth color CLR4). It should be noted that the first color CLR1 and the second color CLR2 have a complementary color relationship, and the lightness of the first color CLR1 is greater than that of the second color CLR2.

Under these conditions, preferable combinations of the first to fourth colors CLR1, CLR2, CLR3, and CLR4 are, for example, three patterns shown in the figure. Cyan light comprises a blue component and a green component. Magenta light comprises a blue component and a red component. Yellow light comprises a green component and a red component. A yellow color film absorbs a blue component. A blue color film absorbs a green component and a red component. A magenta color film absorbs a green component. A green color film absorbs a blue component and a red component. A cyan color film absorbs a red component. A red color film absorbs a green component and a blue component.

In a pattern 1, the first color CLR1 is yellow, the second color CLR2 is blue, the third color CLR3 is cyan, and the fourth color CLR4 is magenta. Thus, the output color of light from the first light sources LS1 transmitted by the first color film CF1 is green. The output color of light from the second light sources LS2 transmitted by the first color film CF1 is red. The output color of light from the first light sources LS1 and the second light sources LS2 transmitted by the second color film CF2 is blue.

In a pattern 2, the first color CLR1 is magenta, the second color CLR2 is green, the third color CLR3 is cyan, and the fourth color CLR4 is yellow. Thus, the output color of light from the first light sources LS1 transmitted by the first color film CF1 is blue. The output color of light from the second light sources LS2 transmitted by the first color film CF1 is red. The output color of light from the first light sources LS1 and the second light sources LS2 transmitted by the second color film CF2 is green.

In a pattern 3, the first color CLR1 is cyan, the second color CLR2 is red, the third color CLR3 is magenta, and the fourth color CLR4 is yellow. Thus, the output color of light from the first light sources LS1 transmitted by the first color film CF1 is blue. The output color of light from the second light sources LS2 transmitted by the first color film CF1 is green. The output color of light from the first light sources LS1 and the second light sources LS2 transmitted by the second color film CF2 is red.

Red preferably comprises a dominant wavelength in a wavelength range of 597 to 780 nm, and more preferably comprises a dominant wavelength in a wavelength range of 600 to 660 nm. Green preferably comprises a dominant wavelength in a wavelength range of 500 to 558 nm, and more preferably comprises a dominant wavelength in a wavelength range of 510 to 557 nm. Blue preferably comprises a dominant wavelength in a wavelength range of 380 nm or greater but less than 488 nm, and more preferably comprises a dominant wavelength in a wavelength range of 435 to 475 nm. Cyan preferably comprises a complementary color dominant wavelength in a wavelength range of 590 to 700 nm, and a dominant wavelength in a wavelength range of 430 nm or greater but less than 510 nm. Magenta preferably comprises a complementary color dominant wavelength in a wavelength range of 495 to 580 nm. Yellow preferably comprises a complementary color dominant wavelength in a wavelength range of 350 to 490 nm.

FIG. 9 is a CIE 1976 UCS chromaticity diagram. The vertical axis shows v', and the horizontal axis shows u'. The chromaticity coordinates in this figure are represented as (u', v'). In the figure, a point C corresponds to the chromaticity coordinates of cyan, a point M corresponds to the chromaticity coordinates of magenta, a point W corresponds to the chromaticity coordinates of white, a point R corresponds to the chromaticity coordinates of red, a point G corresponds to the chromaticity coordinates of green, and a point B corresponds to the chromaticity coordinates of blue.

FIG. 9 shows changes of colors of light radiated by the irradiator BL with arrows. For example, the third color CLR3 is cyan, and the chromaticity coordinates of cyan are (0.18, 0.31). The fourth color CLR4 is magenta, and the chromaticity coordinates of magenta are (0.36, 0.29). The chromaticity coordinates of white, which is a color mixture of the third color CLR3 and the fourth color CLR4, are (0.26, 0.42). All these chromaticity coordinates are rough values.

If the chromaticity coordinates of light of the irradiator BL switched by time division are distant from each other, a display failure called a color breakup becomes likely to occur. The color breakup is a phenomenon in which when the display device is moved, light in separate fields in the same frame period, which will be described later, is visually recognized from different positions, and thus, colors are not properly mixed. To suppress the occurrence of a color breakup, it is preferable that $-0.25<u_1'-u_2'<0.25$ and $-0.25<v_1'-v_2'<0.25$, where $u_1'$ is a u' value of the third color CLR3, $v_1'$ is a v' value of the third color CLR3, $u_2'$ is a u' value of the fourth color CLR4, and $v_2'$ is a v' value of the fourth color CLR4. The amount of change in color chromaticity between cyan, magenta, and white is less than that of change in color chromaticity between red, green, and blue. In the above example, the amount of change of the u' value from cyan to magenta is 0.18, and that of the v' value is −0.02. The amount of change of the u' value from magenta to white is −0.10, and that of the v' value is 0.13. The amount of change of the u' value from white to cyan is −0.08, and that of the v' value is −0.11.

In addition, to suppress the occurrence of a color breakup, it is preferable that a distance L (Euclidean distance) between the third and fourth colors in the CIE 1976 UCS chromaticity diagram be greater than or equal to 0.1 but less than or equal to 0.3. The distance L in the chromaticity diagram can be calculated as $L=\{(u_1'-u_2')^2+(v_1'-v_2')^2\}^{1/2}$. In the above example, the distance L between cyan and magenta is 0.18, the distance L between magenta and white is 0.16, and the distance L between white and cyan is 0.14.

Figure 10:
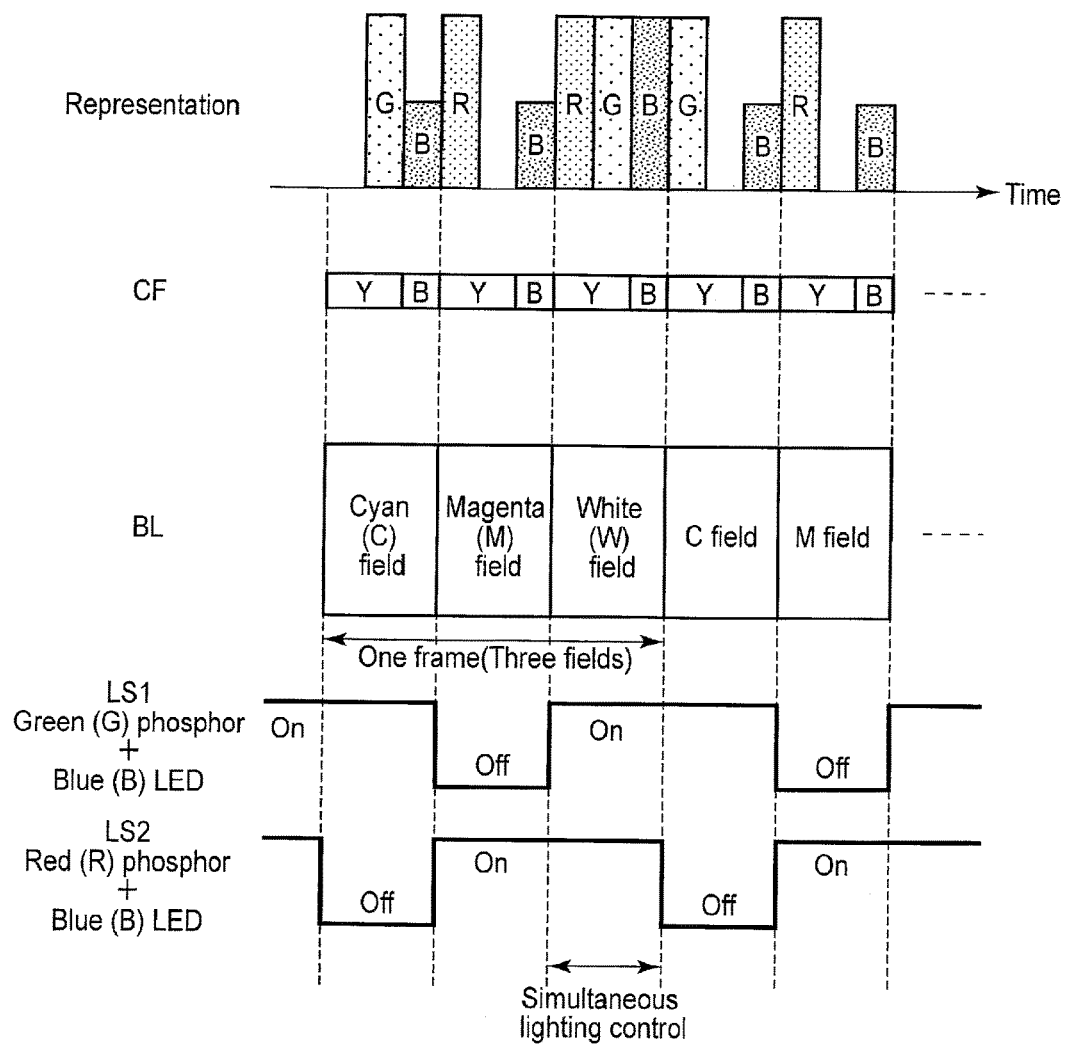
FIG. 10 is a timing chart showing operations of the display device in the present embodiment.

FIG. 10 is a timing chart showing operations of the display device in the present embodiment. The pattern 1 shown in FIG. 8 will be herein described as an example.

In the figure, the irradiator BL switches the color of light radiated to color films CF in a time sequence in which one frame period is divided into three fields of a cyan field (⅓ frame), a magenta field (⅓ frame), and a white field (⅓ frame). In the cyan field, the first light sources LS1 are turned on, and the second light sources LS2 are turned off. In the magenta field, the first light sources LS1 are turned off, and the second light sources LS2 are turned on. In the white field, the first light sources LS1 and the second light sources LS2 are both turned on. Displayable colors in the cyan field are green and blue. Displayable colors in the magenta field are red and blue. Displayable colors in the white field are red, green, and blue.

Thus, in the cyan field, color representations of green, blue, and an intermediate color between green and blue can be made. In the magenta field, color representations of red, blue, and an intermediate color between red and blue can be made. In the white field, color representations of an intermediate color between red and green, blue, an intermediate color (that is, white) between red, green, and blue can be made. A color representation in the cyan field, a color representation in the magenta field, and a color representation in the white field displayed by time division are mixed to be a color representation in one frame. Even if there is no white field, color representations of red, green, and blue can be made in one frame period. Thus, the irradiator BL may switch the color of light radiated to the color films CF in a time sequence in which one frame period is divided into two fields of a cyan field (½ frame) and a magenta field (½ frame). The occurrence of a color breakup can be suppressed by the existence of a white field. It is therefore preferable that the irradiator BL be driven by a time sequence including a white field.

According to the present embodiment, the display device DSP comprises the first color film CF1, the second color film CF2, and the irradiator BL which radiates light of the first light sources LS1 and light of the second light sources LS2 in a switching manner by time division. Thus, in comparison with a display device in which pixels, the smallest display units of an image, comprise three different color films, the display device DSP of the present embodiment can reduce the area of a region which does not contribute to display, such as switching elements and various lines. Thus, even if the pixels PX are miniaturized, the area which contributes to display can be sufficiently secured in the pixels PX, and a decrease in transmittance can be suppressed. In addition, in the display device DSP of the present embodiment, fewer light components are absorbed in color films than in a display device comprising a white light source and three kinds of color film. Thus, the transmittance of the display panel PNL can be improved.

In addition, according to the present embodiment, the display device DSP has fewer boundaries between color films than a display device comprising three kinds of color film. Thus, even if the pixels PX are made denser to achieve higher fineness, the total area of the light-shielding layer BM disposed along the boundaries can be reduced. That is, according to the present embodiment, the display device DSP can suppress a decrease in the transmittance of the display panel PNL.

In addition, the lightness of the first color CLR1 is greater than that of the second color CLR2, and the area of the first color film CF1 is greater than that of the second color film CF2. Thus, according to the present embodiment, the display device DSP can improve brightness.

In addition, even if the pixels PX are miniaturized (for example, resolution of 400 ppi or more), the area which contributes to display in the pixels PX can be sufficiently secured. Thus, display brightness necessary for the display device DSP can be obtained without greatly increasing the brightness of the irradiator BL. Thus, an increase in power consumption can be suppressed.

The display device DSP of the present embodiment is a display device of a field-sequential color (FSC) system of the type which switches light of the first light sources LS1 and the second light sources LS2 by time division. In comparison with a display device of the FSC system of the type which switches light of a red light source, a green light source, and a blue light source by time division, the driving frequency of the irradiator BL can be suppressed and power consumption can be reduced.

According to the present embodiment, the display device DSP comprises the first switching elements SW1 which control the first optical elements OE1 corresponding to the first color sub-films SF1, respectively, and the second switching elements SW2 which control the second optical elements OE2 corresponding to the second color sub-films SF2, respectively. Since the first switching elements SW1 are greater in number than the second switching elements SW2, the number of first color sub-films SF1 is greater than that of second color sub-films SF2. The visual resolution of the human eye is lower for the second color CLR2 than for the first color CLR1. Thus, the display device DSP can reduce the density of the second sub-pixels SX2 without spoiling a sense of resolution. Therefore, the display device DSP can reduce the area of the light-shielding layer BM in the display area DA and improve the transmittance of the display panel PNL. In addition, the total number of switching elements can be reduced, and thus, the power consumption of the display device DSP can be reduced.

In the present embodiment, one or more second color sub-films SF2 are surrounded by first color sub-films SF1 greater in number than the one or more second color sub-films SF2. That is, one second color sub-film SF2, for which the visual resolution is low, is shared by pixels PX, whereby the display device DSP can improve a sense of resolution in a pseudo manner.

As described above, according to the present embodiment, a display device which can achieve higher fineness while suppressing a decrease in transmittance can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising a first color film of a first color and a second color film of a second color in a display area in which an image is displayed, and being configured to display the image when light radiated by an irradiator is transmitted by the first color film and the second color film, wherein the irradiator comprises a first light source configured to radiate light of a third color and a second light source configured to radiate light of a fourth color, and is configured to radiate light to the display area,
the first color and the second color have a complementary color relationship,
lightness of the first color is greater than lightness of the second color,
in the display area, a first total displayable area of the first color film is larger than a second total displayable area of the second color film, and
the irradiator is configured to radiate light of the first light source and the second light source to the display area in a switching manner by time division.

2. The display device of claim 1, comprising:
a first substrate;
a second substrate;
first optical elements and second optical elements provided between the first substrate and the second substrate;
first switching elements configured to control the first optical elements and second switching elements configured to control the second optical elements, the first and second switching elements being formed on the first substrate; and
first color sub-films constituting the first color film, and second color sub-films constituting the second color film,
wherein the first switching elements are configured to control the first optical elements corresponding to the first color sub-films, respectively,
the second switching elements are configured to control the second optical elements corresponding to the second color sub-films, respectively, and
in the display area, the first switching elements are greater in number than the second switching elements.

3. The display device of claim 2, wherein one or more second color sub-films of the second color sub-films are surrounded by first color sub-films of the first color sub-films greater in number than the one or more second color sub-films.

4. The display device of claim 3, wherein a ratio of the first color sub-films to the second color sub-films is 2:1.

5. The display device of claim 2, wherein in the display area, a first displayable area of the first color sub-film is smaller than a second displayable area of the second color sub-film.

6. The display device of claim 1, comprising:
a first sub-pixel and a second sub-pixel comprising the first color film; and
a third sub-pixel comprising the second color film,
wherein the first sub-pixel extends in a direction differing from a direction of the second sub-pixel,
the third sub-pixel is located between the first sub-pixel and the second sub-pixel,
the first sub-pixel comprises a first side and a second side on an opposite side to the first side,
the second sub-pixel comprises a third side aligned in a direction in which the first side extends and a fourth side aligned in a direction in which the second side extends, and
in the third sub-pixel, a length between the first side and the third side differs from a length between the second side and the fourth side.

7. The display device of claim 6, further comprising:
a fourth sub-pixel comprising the first color film, being adjacent to the first sub-pixel at the third side, and extending in a same direction as the second sub-pixel; and a fifth sub-pixel comprising the first color film, being adjacent to the second sub-pixel at the fourth side, and extending in a same direction as the first sub-pixel, wherein the third sub-pixel is located between the fourth sub-pixel and the fifth sub-pixel, and in the third sub-pixel, the length between the first side and the third side is shorter than the length between the second side and the fourth side.

8. The display device of claim 1, comprising:

a first sub-pixel and a fourth sub-pixel comprising the first color film; and a third sub-pixel comprising the second color film, wherein the first sub-pixel extends in a direction differing from a direction of the fourth sub-pixel, the third sub-pixel is adjacent to the first sub-pixel and the fourth sub-pixel in a first direction, the first sub-pixel and the fourth sub-pixel are adjacent with the third sub-pixel not interposed between the first sub-pixel and the fourth sub-pixel in a second direction crossing the first direction, and a length of the third sub-pixel in the first direction is shorter than a length of the third sub-pixel in the second direction.

9. The display device of claim 1, wherein the first color is yellow, and the second color is blue.

10. The display device of claim 1, comprising color characteristics of red, green, and blue by combining the third color and the fourth color.

11. The display device of claim 1, wherein in a CIE 1976 UCS chromaticity diagram, $-0.25 < u_1' - u_2' < 0.25$, and $-0.25 < v_1' - v_2' < 0.25$, where $u_1'$ is a u' value of the third color, $v_1'$ is a v' value of the third color, $u_2'$ is a u' value of the fourth color, and $v_2'$ is a v' value of the fourth color.

12. The display device of claim 1, wherein the third color is cyan, the fourth color is magenta, and the irradiator switches a cyan field in which the first light source is turned on, a magenta field in which the second light source is turned on, and a white field in which the first light source and the second light source are simultaneously turned on by time division.

13. The display device of claim 1, wherein resolution is 400 ppi or more.

14. A color filter substrate used in a display device configured to switch a light source of an irradiator by time division, the color filter substrate comprising a first color film of a first color and a second color film of a second color, wherein the first color and the second color have a complementary color relationship, lightness of the first color is greater than lightness of the second color, and in a display panel, a first total displayable area of the first color film is larger than a second total displayable area of the second color film.

15. The color filter substrate of claim 14, wherein the first color film comprises first color sub-films, the second color film comprises second color sub-films, one or more second color sub-films of the second color sub-films are surrounded by first color sub-films of the first color sub-films greater in number than the one or more second color sub-films.

16. The color filter substrate of claim 15, wherein the first color sub-films is greater in total number than the second color sub-films.

17. The color filter substrate of claim 15, wherein an area of the first color sub-film is smaller than an area of the second color sub-film.

18. The color filter substrate of claim 15, wherein one of the first color sub-films and one of the second color sub-films are alternately arranged in a first direction, and the first color sub-films arrange in a second direction in sequence.

19. The color filter substrate of claim 18, wherein a maximum value of a length of the second color sub-film in the first direction is less than a maximum value of a length of the second color sub-film in the second direction.

20. The color filter substrate of claim 14, wherein the first color is yellow, and the second color is blue.

* * * * *